United States Patent Office 3,048,499
Patented Aug. 7, 1962

---

3,048,499
PROCESS FOR RENDERING STRUCTURAL MATERIALS WATER REPELLENT
Maurice H. Jellinek, Williamsville, N.Y., assignor to Union Carbide Corporation, a corporation of New York
No Drawing. Filed Jan. 18, 1956, Ser. No. 559,796
7 Claims. (Cl. 117—123)

This invention relates to the treatment of structural materials to render such materials water repellent. More particularly, it is concerned with an improved process for water proofing materials, such as stone, brick, concrete, and the like, by treatment with a water soluble silicon compound, and with novel compositions of matter comprising such materials.

It is well known that water repellency has been conferred on building materials by treating the surfaces to render them repellent to liquid water but permeable to water vapor. Such methods have been recognized as advantageous since there is no water vapor locked within the building material and the structure is capable of transpiring or "breathing." The materials which produce repellency without sealing are best represented by the siloxane resins now being used with good commercial success. However, a serious disadvantage in the use of such conventional compounds lies in the fact that they must be applied from an organic solvent solution. The use of such organic solvents is known to be accompanied by many hazards, such as the danger of an operator inhaling solvent vapors, the flammability of such solvents, and their often excessive cost. In addition, a particularly vexing problem of both chemical supplier and the ultimate user has been the necessity for careful handling of the solvents and accurate proportioning thereof, especially in those cases where water-alcohol has been required. Thus, a silicon compound of sufficient water solubility to eliminate the need for any carrier other than water has a particularly great utilitarian advantage. For example, from the standpoint of the silicon compound supplier such would be particularly desirable since 100% concentrates could be shipped, thus effecting savings in freight charges. The ultimate user could then simply dissolve the concentrates in water, add catalyst if necessary, and apply the resultant solution to the structural materials.

Accordingly, it is a primary object of the invention to overcome the aforementioned difficulties by providing silicon compounds which are soluble in water without the addition of emulsifying agents or solubilizers, such as alcohol. A further object is to provide a method for rendering structural materials water repellent by treatment with silicon compounds which are soluble in a water carrier, thereby overcoming the disadvantages inherent in the use of flammable, toxic and expensive organic solvents.

It is a more specific object of the invention to provide a method for rendering structural materials water repellent by treatment with silicon compounds which are soluble in a water carrier, and possess a solution life of adequate duration, e.g., from about 24 hours in tap water to about 90 hours in neutral water.

These and additional objects and advantages will be apparent from the following description of the invention.

The present invention is based on my discovery that certain silicon compounds may be prepared which are soluble in water and that water solutions of such compounds, containing a small amount of catalyst if necessary, may then advantageously be employed for treating and rendering water-repellent structural materials, such as stone, brick, mortar, concrete, asbestos cement shingles and the like. Treatment of such materials may be carried out by simply applying the water solution to the surface of the material by any suitable means, e.g. by spraying, with a brush, a cloth, etc.

The silicon compounds which are sufficiently water soluble for use in my process may be represented generically as:

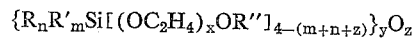

wherein R is a monovalent hydrocarbon radical containing from 1 to about 5 carbon atoms, R' is a constituent selected from the group consisting of a methyl group and a hydrogen atom, R" is a methyl or ethyl hydrocarbon radical, $n$ is an integer from 1 to 2 inclusive $m$ is 0 or 1, the sum of $m$ and $n$ is 2 or less, $y$ is an integer from 1 to 2 inclusive, $z$ is 0 or 1, $y$ is $z$ plus 1, and $x$ is from 1 to a preferred upper limit of about 7, although it may be somewhat higher.

In such compounds wherein more than one oxyalkylene group appears, it will be understood, of course, that $x$ may have a different value in each group. For example, where the quantity $[4-(m+n+z)]$ is 2 in a given compound, $x$ may be 1 in one oxyalkylene group and 2 in the other.

The compound useful in accordance herewith may be prepared by directly esterifying the corresponding chlorosilane, or siloxane as the case may be, with a slight excess of hydroxyl-containing alkylene oxide compound followed by fractional distillation at reduced pressure, or by esterifying the chlorosilane with a low boiling alcohol, such as ethanol, and then conducting a transesterification reaction to replace the ethoxy group with the desired alkoxy substituent. A suitable catalyst may be used to speed the transesterification reaction.

Although I do not wish to be bound by any particular theory, it is believed that the net effect of the reaction above described is to form a water soluble alkoxy substituted silicon compound from a chlorosilicon starting material, which silicon compound is capable of penetrating readily and deeply into the structural materials while undergoing hydrolysis and condensation on the materials to produce a water repellent film.

Examples of compounds corresponding to the above general formulae are methyl tris (beta methoxy ethoxy) silane $CH_3-Si-[(OC_2H_4)OCH_3]_3$, ethyl tris (beta methoxy ethoxy) silane $CH_3-CH_2-Si-[(OC_2H_4)OCH_3]_3$, ethyl tris (methoxy diethylene glycoxy) silane $$CH_3-CH_2-Si-[(OC_2H_4)_2OCH_3]_3$$

dimethyl di (beta methoxy ethoxy) silane $$(CH_3)_2-Si-[(OC_2H_4)OCH_3]_2$$

methyl hydrogen di (beta methoxy ethoxy) silane $CH_3-SiH-[(OC_2H_4)OCH_3]_2$, ethyl di (beta methoxy ethoxy) mono ethoxy silane

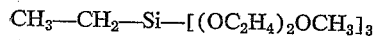
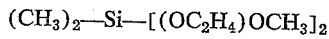

and diethyl tetra (beta methoxy ethoxy) disiloxane

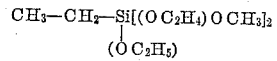
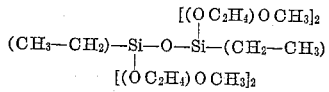

Set forth below are illustrative examples for the purpose of demonstrating the manner in which compounds of the type above described may be prepared:

EXAMPLE I

*Preparation of Methyl Tris (Beta Methoxy Ethoxy) Silane*

Four moles (598 g.) methyltrichlorosilane were added to 16 moles (1216 g.) methyl "Cellosolve"

$$(CH_3OC_2H_4OH)$$

(a product of Carbide and Carbon Chemicals Division of Union Carbide and Carbon Corp.) and the mixture was heated over a period of 5 minutes, during which the temperature rose from 20° C. to 60° C. The crude ester was then refluxed for 4 hours at the boiling point of the methyl "Cellosolve" (124° C.–130° C.) to eliminate the HCl. The resulting ester was very readily soluble in water, at 12% concentration.

EXAMPLE II

*Preparation of Ethyl Tris (Beta Methoxy Ethoxy) Silane*

Three and one-half moles (573 g.) ethyltrichlorosilane were added to 15.6 moles (1184 g.) methyl "Cellosolve" and the mixture was heated over a period of 20 minutes during which the temperature range was 20° C. to 58° C. to 50° C. The crude ester was then refluxed and heated for 4 hours to a maximum temperature of 160° C.

This first preparation was insoluble, probably due to the high temperature attained during the reflux and neutralization. Later batches had a controlled temperature of reflux at 120° C.–130° C. and 18.9% methyl "Cellosolve" was stripped off with the effluent HCl. On a weight balance basis, the product consisted of 81% of the desired ester and the remainder was methyl "Cellosolve." The product was soluble in water at 10% concentration.

EXAMPLE III

*Preparation of Ethyl Tris (Methoxy Diethylene Glycoxy) Silane*

3.04 moles (365 g.) methyl "Carbitol"

[CH$_3$O(C$_2$H$_4$O)$_2$H]

(a product of Carbide and Carbon Chemical Division of Union Carbide and Carbon Corp.) were added to 0.765 mole (125 g.) ethyltrichlorosilane and the mixture was heated over a period of 5 minutes during which the temperature range was 22° C.–85° C. The crude ester was refluxed and heated at 170° C.–180° C. for 4 hours. The product was soluble in water.

EXAMPLE IV

*Preparation of Dimethyl Di (Beta Methoxy Ethoxy) Silane*

Four moles (516 g.) dimethyldichlorosilane were added to 12 moles (912 g.) methyl "Cellosolve" and the mixture was heated over a 15 minute period during which the temperature range was 22.5° C.–45° C. The crude ester was refluxed at 120° C.–130° C. for 5 hours. The product was neutral to indicator paper and soluble in water.

EXAMPLE V

*Preparation of Methyl Hydrogen Di (Beta Methoxy Ethoxy) Silane*

Three moles (346.2 g.) methyl hydrogen dichlorosilane were added to 7.5 moles (571 g.) methyl "Cellosolve" over a period of 20 minutes during which the maximum temperature was 30° C. The crude ester was then heated for 2 hours to a maximum temperature of 105° C. at which time it was neutral to indicator paper. The product was 84% ester. The ester was water soluble.

EXAMPLE VI

*Preparation of Ethyl Di (Beta Methoxy Ethoxy) Mono Ethoxy Silane*

Two moles (326 g.) ethyltrichlorosilane were added to 4.0 moles (304 g.) methyl "Cellosolve" over a period of 5 minutes during which the temperature range was 21° C.–36° C. The crude ester was refluxed for 1 hour. Two moles (92 g.) ethanol were added and the solution was refluxed until neutral to indicator paper. The product was water soluble.

EXAMPLE VII

*Preparation of Diethyl Tetra (Beta Methoxy Ethoxy) Disiloxane*

Two moles (620 g.) diethyl tetra ethoxy disiloxane, 1.22 g. trifluoroacetic acid, and 10 moles (760 g.) methyl "Cellosolve" were mixed in a reaction kettle. The mixture was heated at the boiling point of methyl "Cellosolve" until the calculated amount of ethanol was removed through a fractionating column, together with a small portion of the excess methyl "Cellosolve." The product was neutral and water soluble.

EXAMPLE VIII

*Preparation of Amyl Tris (Beta Methoxy Ethoxy) Silane*

In a 3 liter, 3-necked flask were placed 8 moles methyl "Cellosolve" (608 g.). To this was added, dropwise, 2 moles amyltrichlorosilane (411 g.) at a steady rate. Upon completion of the chlorosilane addition, the ester was refluxed to neutrality at temperatures not exceeding 130° C. Reflux time was six hours.

The excess methyl "Cellosolve" was not removed. The product, which was orange in color, indicating presence of some impurity, was not soluble in water in large concentrations. However, 5 parts of the product was soluble in 100 parts of water.

The amount of silicon compound present in the water solution is not critical. The relatively dense materials, such as limestone, require higher concentrations while the more porous materials, like lightweight concrete block, can be effectively treated with dilute solutions.

It is believed that the mechanism whereby these compositions produce water repellency on a surface involves hydrolysis, condensation and orientation. It is known that the silicon compounds or esters themselves do not effect water repellency while the siloxane resins resulting after polymerization are effective for this purpose.

In view of this belief, it is convenient to refer to the treating solution as being equivalent to an amount of resin. That is, based upon stoichiometry it is convenient to refer to the ultimate polymer that would be present if the reaction went to 100% completion rather than the origin reactants. Stated in other words, if the treating solution were not applied to a structural material and the reaction were allowed to proceed to stoichiometric completion in the solution container, the product of the reaction would be a resin and it is this resin that is referred to in defining the treating solution concentrations in the examples that follow. It has been found that porous materials may be treated with solutions containing 1% resin or less. In general, however, a solution of about 1 to 5 parts contained resin by weight per 100 parts water is effective on most materials. It is obvious, of course, that minor adjustments may be made to take care of particular situations. It will also be appreciated that more than one of the above described silicon compounds falling under the same genus may be mixed in the treating solution if desired.

In carrying out my process, the structural materials are surface treated with the aqueous solution in such a manner that the silicon compound deeply penetrates into the pores of the entire surface to be treated. The treated material is then allowed to dry whereupon the surface is left with a durable water-repellent coating.

Since the hydrolysis of alkoxy esters is speeded considerably by the presence of catalytic amounts of acidic or basic materials, it is frequently advisable to add such an agent to the treating solution. Catalysts employed in the treating solution may be any materials which change the pH of the water solution from neutral as determined by indicator paper (about 7) to either an acidic or an alkaline condition. Examples of useful catalysts of this type are the following: NaOH, KOH, Na$_2$CO$_3$, CaO, diethanolamine, quaternary ammonium hydroxides, NH₄OH zirconium oxychloride, zinc "octasol" (zinc salt of octoic acid), bis zirconium cyclopentadienyldichloride, zirconium acetylacetonate, zirconium nitrate, bis cyclopentadienyl titanium difluoride, and trifluoroacetic acid. Effective materials not involving pH change include many metal-containing salts, soaps and chelates, where the metal appears to be catalytic. Typical of these are organometallic compounds of metals such as zinc, zirconium and cobalt.

The amount of catalyst which is preferred is about 0.02 part by weight per 100 parts of water. On the other hand, some substrates are intrinsically sufficiently alkaline so that the treating solution hydrolyzes at a reasonable rate and condenses into repellent polymers without assistance. Typical of such materials are mortar and concrete, while others like sandstone or limestone are essentially neutral and the addition of a few hundredths of a percent of sodium hydroxide or other catalysts provides the necessary alkalinity.

To demonstrate the effectiveness of the herein defined compounds, the following examples are illustrative:

One test for repellency that is semi-quantitative involves placing a drop of water onto the treated surface and observing the angle of contact between the water drop and the treated surface. When a non-repellent surface such as glass has a drop of water placed thereon it spreads and flattens to the surface and the contact angle is very low or poor. When the surface is repellent, high or good contact angles exist.

EXAMPLE A

Visual Tests for Repellency on Mortar Blocks

In the following tabulation are listed the compounds tested on mortar blocks, the concentrations of the treating solution in weight percent and the observed contact angles:

| Compound | Wt. Percent Silicon Compound Concentration in Water (Equivalent to 3% Resin) | Observed Contact Angle |
| --- | --- | --- |
| CH₃Si(OCH₂CH₂OCH₃)₃ | 12 | ¹ Very high. |
| C₂H₅Si(OCH₂CH₂OCH₃)₃ | 10.4 | Do. |
| R(Z)₂SiOSi(Z)₂R | 7.8 | Do. |
| R=ethyl | | |
| Z=(OCH₂CH₂OCH₃) | | |
| Blank | | Very poor. |

¹ Very high indicates an angle of at least about 95°.

Many compounds, of which the following are typical, gave good results in this test:

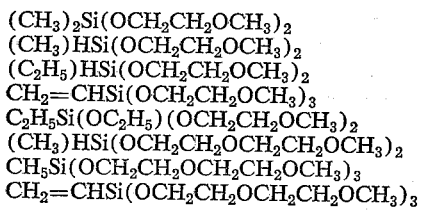

$(CH_3)_2Si(OCH_2CH_2OCH_3)_2$
$(CH_3)HSi(OCH_2CH_2OCH_3)_2$
$(C_2H_5)HSi(OCH_2CH_2OCH_3)_2$
$CH_2=CHSi(OCH_2CH_2OCH_3)_3$
$C_2H_5Si(OC_2H_5)(OCH_2CH_2OCH_3)_2$
$(CH_3)HSi(OCH_2CH_2OCH_2CH_2OCH_3)_2$
$CH_3Si(OCH_2CH_2OCH_2CH_2OCH_3)_3$
$CH_2=CHSi(OCH_2CH_2OCH_2CH_2OCH_3)_3$

Some of these compounds are not completely soluble, but dissolve and disperse in water to a satisfactory degree.

EXAMPLE B

Immersion Tests on "Crab Orchard" Stone

"Crab Orchard" stone, one of the more difficult materials to treat, was treated with water solutions of certain of the compounds of the instant invention containing an amount of alkoxysilane equivalent to 3% of contained resin. The blocks were allowed to dry and were then immersed in water. Prior to immersion in water it was observed that considerable improvement in the contact angle of water drops with the surface resulted due to the treatment. At the conclusion of 120 hours the amount of water absorbed relative to a blank was determined. The table below gives the compounds and the relative absorption:

| Compound | Weight Percent Alkoxysilane Concentration in Water (Equivalent to 3 Percent Resin) | Relative Percent Absorption with Respect to Blank=100 Percent |
| --- | --- | --- |
| CH₂=CHSi(OCH₂CH₂OCH₂CH₂OCH₃)₃ ¹ | 15.7 | 0 |
| CH₃CH₂Si(OCH₂CH₂OCH₂CH₂OCH₃)₃ ¹ | 15.4 | 42 |
| CH₃CH₂Si(OCH₂CH₂OCH₃)₃ | 10.4 | 42 |
| CH₂=CHSi(OCH₂CH₂OCH₃)₃ | 11.5 | 51 |
| No treatment | | 100 |

¹ Alkaline catalyst used: 0.02% NaOH.

EXAMPLE C

Immersion Tests on Common Cement Blocks

Cement blocks, made from a common cement mixture, were tested as in Example A and were submitted to the same immersion test. Measurements were made at the end of two and 18 hours. All the compounds used produced a considerable improvement in the contact angle between water drops and the treated surface. The following table gives the observed results:

| Compound | Weight Percent Alkoxysilane Concentration in Water (Equivalent to 3 Percent Resin) | Relative Percent Absorption After 2 hr. | After 18 hrs. |
| --- | --- | --- | --- |
| CH₃CH₂Si(OCH₂CH₂OCH₃)₃ | 10.4 | 14 | 34 |
| CH₃Si(OCH₂CH₂OCH₃)₃ | 12.0 | 29 | 78 |
| (CH₃)₂Si(OCH₂CH₂OCH₃)₂ | 8.3 | 29 | 61 |
| CH₃Si(OCH₂CH₂OCH₃)₃ ¹ | 12.0 | 33 | |
| CH₂=CHSi(OCH₂CH₂OCH₃)₃ | 11.5 | 43 | |
| CH₃CH₂Si(OCH₂CH₂OCH₃)₃ ¹ | 10.4 | | 78 |
| CH₂=CHSi(OCH₂CH₂OCH₃)₃ ¹ | 11.5 | | 80 |

¹ Alkaline catalyst used: 0.02% NaOH.

EXAMPLE D

Immersion Tests on Building Brick

Building brick was used in this test. All samples showed improved repellency by the contact angle test. The relative absorption as compared to an untreated brick was measured at the end of 71 hours.

| Compound | Wt. Percent Alkoxysilane Concentration in Water (Equivalent to 3% Resin) | Relative Percent Absorption |
| --- | --- | --- |
| CH₃Si(OCH₂CH₂OCH₃)₃ ¹ | 8.3 | 15 |
| CH₃CH₂Si(OCH₂CH₂OCH₃)₃ ¹ | 10.4 | 27 |
| CH₃Si(OCH₂CH₂OCH₃)₃ | 12.0 | 28 |
| CH₃CH₂Si(OCH₂CH₂OCH₃)₃ | 10.4 | 41 |

¹ Alkaline catalyst used: 0.02% NaOH

EXAMPLE E

Immersion Tests on Mortar Blocks

These tests were carried out on mortar. Blocks were made from commercially available premixed mortar which merely requires mixing in the presence of water. Tests were carried out on both freshly set (green) and aged mortar. Improved contact angle was observed in all instances. The observed relative absorption after 4 and 96 hours' total immersions were measured and are given below.

| Compound | Wt. percent Alkoxysilane Concentration in Water (Equivalent to 3% Resin) | Relative percent Aged Mortar | | Absorption Green Mortar | |
|---|---|---|---|---|---|
| | | 4 hr. | 96 hr. | 4 hr. | 96 hr. |
| CH₃CH₂Si(OCH₂CH₂OCH₃)₃ | 10.4 | 15 | 30 | 15 | 77 |
| CH₃Si(OCH₂CH₂OCH₃)₃ | 12.0 | 14 | 44 | 22 | |
| CH₂=CHSi(OCH₂CH₂OCH₃)₃ | 11.5 | 65 | 72 | | 81 |
| CH₂=CHSi(OCH₂CH₂OCH₂CH₂OCH₃)₃ | 15.7 | | 75 | | |
| (CH₃)₂Si(OCH₂CH₂OCH₃)₂ | 8.3 | 63 | 85 | 36 | 80 |
| CH₃CH₂Si(OCH₂CH₂OCH₂CH₂OCH₃)₃ | 15.4 | | | 76 | 81 |
| C₅H₁₁Si(OCH₂CH₂OCH₃)₃ ¹ | 8.0 | 12 (24 hrs.) | 26 | | |

¹ Catalyst used: ZrOCl₂·8H₂O (1% Zr based on contained resin and calculated as the metal in ZrOCl₂·8H₂O).

EXAMPLE F

*Immersion Tests on Limestone*

Limestone, which is one of the most difficult materials to make repellent with any silicone, was the subject for this test. The immersion test on the sample, treated as in Example A, was carried on for 71 hours. The relative absorption values as compared to an untreated sample at the end of this period are given below:

| Compound | Wt. percent Alkoxysilane Concentration in Water (Equivalent to 3% Resin) | Relative percent Absorption |
|---|---|---|
| CH₃Si(OCH₂CH₂OCH₃)₃ ¹ | 12.0 | 36 |
| CH₃Si(OCH₂CH₂OCH₃)₃ | 12.0 | 43 |
| CH₂=CHSi(OCH₂CH₂OCH₃)₃ | 11.5 | 46 |
| CH₂=CHSi(OCH₂CH₂OCH₂CH₂OCH₃)₃ ¹ | 15.7 | 52 |
| CH₂=CHSi(OCH₂CH₂OCH₂CH₂OCH₃)₃ | 15.7 | 58 |
| CH₃CH₂Si(OCH₂CH₂OCH₃)₃ | 10.4 | 78 |

¹ Alkaline catalyst used: 0.02% NaOH.

EXAMPLE G

*Immersion Tests on Asbestos Cement Blocks*

Asbestos cement molded blocks were treated with solution containing the equivalent of 5% resin. The blocks, which are used for electrical insulation, were dipped for 10 minutes followed by cure at 150° C. for 1 hour. Very high contact angles resulted. Relative water absorption after 18 hours compared to an untreated blank is given below:

| Compound | Wt. Percent Alkoxysilane Concentration in Water (Equivalent to 3% Resin) | Relative Percent Absorption |
|---|---|---|
| CH₃CH₂Si(OCH₂CH₂OCH₃)₃ | 17.4 | 19 |
| CH₃Si(OCH₂CH₂OCH₃)₃ | 20 | 21 |

Having thus described my invention, what I claim as novel and desire to protect by Letters Patent is as follows:

1. The method of rendering masonry-type structural material water repellent, which method consists essentially of:
   (1) contacting said structural material with an aqueous solution:
      (a) that is free of any organic solvent;
      (b) that contains a resin-forming compound corresponding to the general formula:

$$\{R_n R_m'Si[(OC_2H_4)_xOR'']_{4-(m+n+z)}\}_y O_z$$

wherein R is a monovalent hydrocarbon radical containing from 1 to about 5 carbon atoms, R' is a constituent selected from the group consisting of a methyl group and a hydrogen atom, R'' is a hydrocarbon radical selected from the group consisting of methyl and ethyl hydrocarbon radicals, n is an integer from 1 to 2 inclusive, m is selected from the group consisting of 0 and 1, the sum of m and n is an integer from 1 to 2 inclusive, z is selected from the group of 0 and 1, y is z plus 1, and x is an integer of from 1 to about 7, said resin-forming compound being present in an amount sufficient to produce from 1 to 5 parts by weight of a siloxane resin per 100 parts by weight of the water in the aqueous solution; and
      (c) that contains a non-neutral compound selected from the group consisting of acids and bases in an amount which is sufficient to impart a pH other than 7 to the solution and which is sufficient to catalyze the cure of the resin-forming compound to produce a siloxane resin on the structural material; and
   (2) drying the structural material which has been contacted with said aqueous solution to produce a siloxane coating on the structural material, said structural material being insufficiently alkaline to cure the resin-forming compound to produce a siloxane resin.

2. The method of claim 1 wherein the structural material is selected from the group consisting of sandstone and limestone; the non-neutral compound is sodium hydroxide which is present in an amount of about 0.02 part by weight per 100 parts by weight of the water in the aqueous solution; and the resin-forming compound has the formula:

$$(CH_3)HSi(OCH_2CH_2OCH_2CH_2OCH_3)_2$$

3. The method of claim 1 wherein the structural material is selected from the group consisting of sandstone and limestone; the non-neutral compound is sodium hydroxide which is present in an amount of about 0.02 part by weight per 100 parts by weight of the water in the aqueous solution; and the resin-forming compound has the formula:

$$C_2H_5Si(OCH_2CH_2OCH_2CH_2OCH_3)_3$$

4. The method of claim 1 wherein the structural material is selected from the group consisting of sandstone and limestone; the non-neutral compound is sodium hydroxide which is present in an amount of about 0.02 part by weight per 100 parts by weight of the water in the aqueous solution; and the resin-forming compound has the formula:

$$CH_2=CHSi(OCH_2CH_2OCH_2CH_2OCH_3)_3$$

5. The method of claim 1 wherein the structural material is selected from the group consisting of sandstone and limestone; the non-neutral compound is sodium hydroxide which is present in an amount of about 0.02 part by weight per 100 parts by weight of the water in the aqueous solution; and the resin-forming compound has the formula:

$$(CH_3)HSi(OCH_2CH_2OCH_3)_2$$

6. The method of claim 1 wherein the structural material is selected from the group consisting of sandstone and limestone; the non-neutral compound is sodium hydroxide which is present in an amount of about 0.02 part by weight per 100 parts by weight of the water in the aqueous solution; and the resin-forming compound has the formula:

$$(C_2H_5)HSi(OCH_2CH_2OCH_3)_2$$

7. The method of claim 1 wherein the structural material is selected from the group consisting of sandstone and limestone; the non-neutral compound is a base; and the resin-forming compound corresponds to the general formula:

$$R_nR'_mSi[(OC_2H_4)_xOR'']_{4-(m+n)}$$

wherein R is a monovalent hydrocarbon containing from 1 to about 5 carbon atoms, R' is a constituent selected from the group consisting of a methyl group and a hydrogen atom, R'' is a hydrocarbon radical selected from the group consisting of methyl and ethyl hydrocarbon radicals, $n$ is an integer from 1 to 2 inclusive, $m$ is selected from the group consisting of 0 and 1, the sum of $m$ and $n$ is an integer from 1 to 2 inclusive, and $x$ is an integer of from 2 to about 7.

References Cited in the file of this patent

UNITED STATES PATENTS

| | | |
|---|---|---|
| 2,476,307 | Klein et al. | July 19, 1949 |
| 2,481,349 | Robie | Sept. 6, 1949 |
| 2,559,342 | Burkhard | July 3, 1951 |
| 2,582,215 | Hyde | Jan. 15, 1952 |
| 2,683,674 | Hatcher et al. | July 13, 1954 |
| 2,706,723 | Bass | Apr. 19, 1955 |
| 2,726,176 | Hatcher et al. | Dec. 6, 1955 |
| 2,757,159 | Hormats | July 31, 1956 |
| 2,758,946 | Spalding et al. | Aug. 14, 1956 |
| 2,790,777 | Kirkpatrick et al. | Apr. 30, 1957 |
| 2,810,704 | Krantz | Oct. 22, 1957 |